United States Patent [19]

Guy

[11] Patent Number: 4,852,655

[45] Date of Patent: * Aug. 1, 1989

[54] TUBING COUPLING AND METHOD

[76] Inventor: Weldon E. Guy, 4242 Stillwood, Odessa, Tex. 79762

[*] Notice: The portion of the term of this patent subsequent to Sep. 27, 2005 has been disclaimed.

[21] Appl. No.: 249,375

[22] Filed: Sep. 26, 1988

Related U.S. Application Data

[63] Continuation-in-part of Ser. No. 54,944, Jun. 27, 1987, Pat. No. 4,773,479.

[51] Int. Cl.[4] .................. E21B 17/02; F16L 9/14; F16L 15/00
[52] U.S. Cl. .................. 166/380; 166/242; 166/381; 285/55; 285/371
[58] Field of Search .................. 166/242, 380, 381; 285/55, 371

[56] References Cited

U.S. PATENT DOCUMENTS

| | | | |
|---|---|---|---|
| 2,310,944 | 2/1943 | Douglass | 285/371 X |
| 2,349,081 | 5/1944 | Douglass | 285/371 X |
| 3,253,841 | 5/1966 | Ahmad | 285/55 |
| 3,266,821 | 8/1966 | Safford | 285/55 X |
| 3,268,240 | 8/1966 | Gerner | 285/371 X |
| 3,286,341 | 11/1966 | Miller | 285/371 X |
| 3,338,598 | 8/1967 | Kurtz | 285/55 |
| 3,620,555 | 11/1971 | Hinds et al. | 285/55 |
| 4,024,913 | 5/1977 | Grable | 166/242 |
| 4,509,776 | 4/1985 | Yoshida et al. | 285/55 |
| 4,568,113 | 2/1986 | Axford et al. | 285/55 X |

OTHER PUBLICATIONS

Permian Enterprises, Inc., Advertising brochure, Midland, Tex. 79702, (Published prior to 5-27-87).
FMC brochure, "Introducing the FMC Differential-Thread Pipe Connector," FMC Corp., Wellhead Equipment Div., Houston, Tex., 4 pages, 1982.

*Primary Examiner*—Stephen J. Novosad
*Attorney, Agent, or Firm*—Wendell Coffee

[57] ABSTRACT

A tubing string includes a series of tubing sections connected together by cuffs and extends from above the surface of the ground to an oil bearing formation in oil field service. To prevent corrosion of the string, each individual section of tubing has an internal bore which is tapered at the end and a corrosion resistant coating applied to the bore, including the taper. A corrosion resistant nipple is tapered on both ends to fit the taper within the bore of the ends of the tubing. The taper is between about 12° and 60°. The bore of the tubing, including the taper, has a corrosion resistant coating thereon. Therefore, the nipple which floats within the cuff retains the corrosive fluid being carried by the tubing within the bore, and the corrosive material does not contact the cuff, the threads, or any other part of the tubing.

12 Claims, 2 Drawing Sheets

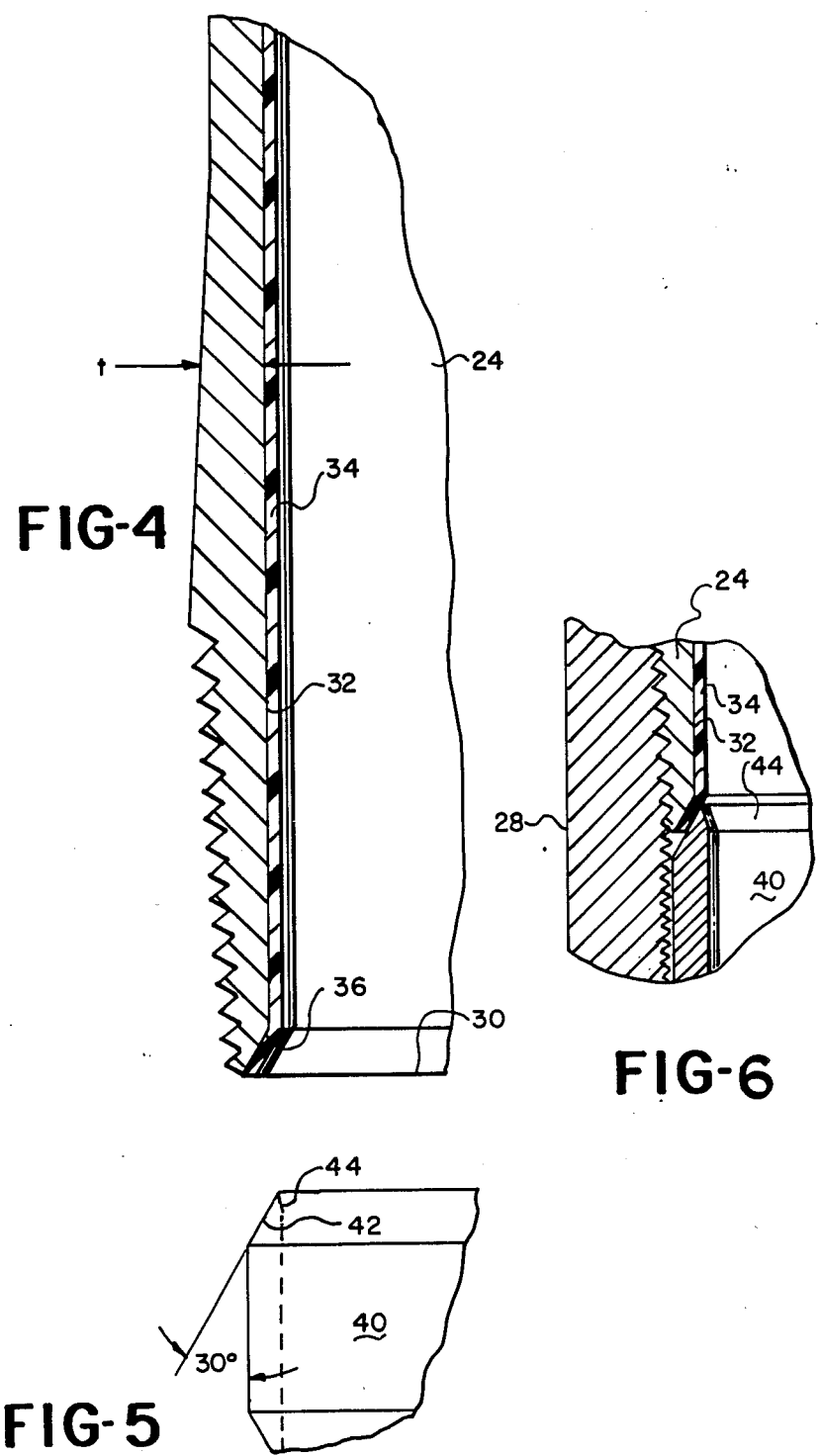

TUBING COUPLING AND METHOD

RIGHTS TO INVENTIONS UNDER FEDERAL RESEARCH:

There was no federally sponsored research and development concerning this invention.

This application is a continuation-in-part of my prior patent application; Ser. No. 07/054,944; entitled Corrosion Guard Tubing Nipple which was filed June 27, 1987 and issued U.S. Pat. No. 4,773,479 on Sept. 27, 1988 bearing the same title.

BACKGROUND OF THE INVENTION:

(1) Field of the Invention

This invention relates to conduits, and more particularly to oil field tubing in wells. Applicant submits that an oil field production person is one having ordinary skill in this art.

(2) Description of the Related Art

It is well known that tubing is used in wells in oil field production. A common example is that tubing which goes inside of a casing and has a pump attached to the bottom in an oil bearing formation. A sucker rod extends from the pump in an oil bearing formation to the top of the tube.

Another example of oil field tubing includes tubing with a submergible motor and pump attached to the bottom. The oil is produced by pumping the oil from the oil bearing formation far below the surface of the ground to the surface through the open tubing.

Other uses include tubing in a water flood field where tubing is used in injection wells and water is pumped down the tubing to an oil bearing formation far below the ground to displace the oil to production wells in the field.

Normally, the string of tubing in an oil well will include individual sections of tubing, e.g., 20' or 30' long having external threads on each end of each section. The sections are connected together by cuffs having internal threads. Because the external threads on the ends of the section would otherwise weaken the tubing, it is common practice to use tubing having upset ends. The ends of the tubing are thicker so that after the threads are cut in them, they still have the necessary tensile strength to support long strings of tubing. It is not unusual to have 10,000' of tubing which is supported from the surface of the earth. Therefore, the tubing must have sufficient tensile strength at the surface to support the weight of 10,000' of tubing.

Also, in many instances, other devices besides sucker rods are passed through the tubing. Although normally these are lowered by a wire line, in certain instances, these devices may be dropped for free fall through the tubing. Therefore, it is extremely important that the tubing have uniform bore from top to bottom, and it is important that the tubing not have any restrictions in the bore from top to bottom, and it is desirable that the tubing not have abrupt changes or ledges in its bore upon which devices could hang. Also, it will be recognized that smooth bore has less resistance to the flow of fluid through it than a bore having abrupt changes. Therefore, it is desirable that the bore be smooth, or if there are any changes in diameter that there be a smooth transition between any changes in diameter.

In many instances the fluids flowing through the tubing will be highly corrosive. Therefore it is known in the art to place a corrosive resistant coating on the inside of the tubing to prevent the fluid passing through the tubing from corroding it.

The joints at each coupling form a corrosion problem. Under normal circumstances, the threaded joint between the tubing and coupling forms a fluid tight seal or joining one tubing section to the next. Because of the mechanical nature of screwing one section to the next, it is difficult, if not impossible, to form a corrosion resistant coating at the threads.

Before the first application was filed, the applicant was aware of the following U.S. Pats.:

| Inventor | Issue Number |
| --- | --- |
| Hinderliter | Re. 19,690 |
| Doolittle | 262,581 |
| Levier | 354,560 |
| Havens | 1,925,533 |
| Douglass | 2,349,081 |
| Eirhart | 3,163,450 |
| Miller | 3,286,341 |
| Krieg | 3,427,050 |
| Gerner | 3,461,918 |
| Grahl | 3,722,923 |
| Dula et al. | 3,811,710 |
| Gold | 3,866,958 |
| Gottlieb | 4,026,583 |
| Lula | 4,366,971 |
| Fruck | 4,400,019 |
| Werner | 4,507,842 |
| Yoshida et al. | 4,509,776 |
| Axford et al. | 4,568,113 |
| Handa et al. | 4,623,173 |

Also, after this application was filed, the Examiner considered additional prior art to be pertinent.

| | |
| --- | --- |
| Douglass | 2,310,944 |
| Ahmad | 3,253,841 |
| Safford | 3,266,821 |
| Gerner | 3,268,240 |
| Kurtz | 3,338,598 |
| Hinds et al. | 3,620,555 |
| Grable | 4,024,913 |

Also, the following publications were of record in the prior application.

Permian Enterprises, Inc. Advertising brochure, Midland, Tex. 79702, (published prior to 5/27/87).

FMC brochure, "Introducing the FMC Differential-Thread Pipe Connector", FMC Corp., Wellhead Equipment Div., Houston, Tex., 4 pages, 1982. Copy in 166/380.

Many of these patents represent efforts of prior workers to solve this problem of the corrosion at the cuffs. Other of these patents show structure similar to this invention; although, the invention was directed to the solution of some other problem.

SUMMARY OF THE INVENTION:

(1) Progressive Contribution to the Art

This invention discloses a nipple or short tube or broad ring or band of corrosion resistant material which fits in the bore or the inside diameter of the tubing at the cuffs. In this way, the corrosive fluid is isolated from the cuffs and is not in contact with the threads of either the tubing or the cuff. The preferred embodiment includes beveling or tapering the ends of the bore of the tubing at about a 30° taper and also tapering the ends of the nipple at about a 30° taper.

(2) Objects of this Invention

An object of this invention is to prevent corrosion in a tubing string used to produce oil from oil bearing formations deep below the earth.

Further objects are to achieve the above with devices that are sturdy, compact, durable, lightweight, simple, safe, efficient, versatile, ecologically compatible, energy conserving, and reliable, yet inexpensive and easy to manufacture, install, and maintain.

Other objects are to achieve the above with a method that is rapid, versatile, ecologically compatible, energy conserving, efficient, and inexpensive, and does not require highly skilled people to install, adjust, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 4 is a detailed sectional view of part of the tubing without the nipple.

FIG. 5 is a detailed sectional view of one end of the nipple.

FIG. 6 is an enlarged sectional detailed view of the joint between the tubing bevel and the nipple bevel.

Figure 1:
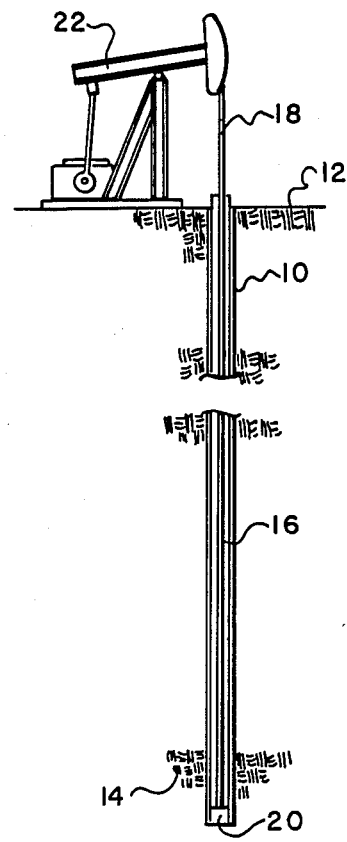
FIG. 1 is a schematic representation of an oil field production well.

As an aid to correlating the terms of the claims to the exemplary drawings, the following catalog of elements and steps is provided:

| | | |
|---|---|---|
| 10 casing | 24 tubing section | 36 taper |
| 12 surface | 26 tubing section | 40 nipple |
| 14 formation | 28 cuff | 42 tapered end |
| 16 tubing string | 30 end of section | 44 internal taper |
| 18 sucker rod | 32 bore | |
| 20 pump | 34 coating | t wall thickness |
| 22 pump jack | | |

DESCRIPTION OF THE PREFERRED EMBODIMENT:

Referring to the drawings, there may be seen a production oil field well. Casing 10 extends from the surface 12 of the earth to oil producing formation 14 far below the surface. Tubing string 16 extends from the oil producing formation 14 to the surface of the earth. Many wells will include sucker rod 18 within the tubing from pump 20 in the oil bearing formation and to above the tubing string 16 to pump jack 22 above the surface of the earth.

The tubing string 16 will include a plurality of sections of tubing 24 and 26 which are connected by a plurality of cuffs 28. As pointed out previously, often the tubing is upset. I.e., each end of the tubing sections 24 and 26 will have a greater wall thickness "t" than the remainder of the tubing. Those having ordinary skill in the art will understand that the American Petroleum Institute (API) has specifications as to the threads of the tubing and to the cuffs. The API specifies the tolerances of the cuff and the torque with which the tubing is to be made up.

A taper or internal bevel 36 is formed on bore 32 at each end 30 of each of the sections. Coating 34 is applied to the bore, including the taper 36, of the tubing. The taper angle is preferred to be about 30°.

Nipple 40 has an external cylindrical portion a the center thereof and is tapered at each end 42. It has the same taper angle as the taper 36 within the bore 32 of the tubing. The inside diameter of the nipple is greater than the inside diameter of the tubing, as explained above.

The nipple is made of corrosion resistant material. One common corrosion resistant material applicable for manufacture of the nipples is stainless steel. There are other corrosion resistant metals which are suitable for particular circumstances. The nipple might be made of a nonmetalic material such as Nylon, or Ryton, or a composite materials such as a Nylon glass composite or Ryton glass composite with a soft plastic overlay such as Teflon, Kynar, Polyethylene, or Polyurethane. The soft overlay will enhance the seal to the tubing, particularly for gas.

Figure 2:
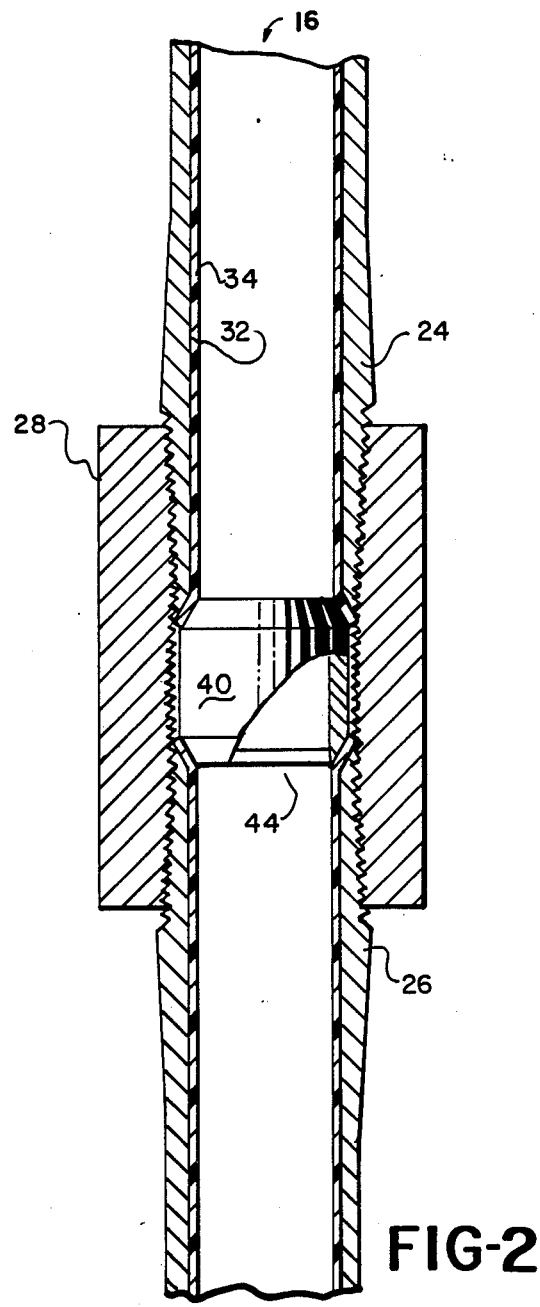
FIG. 2 is an axial sectional view of a coupling with the invention illustrated therein.
Figure 3:
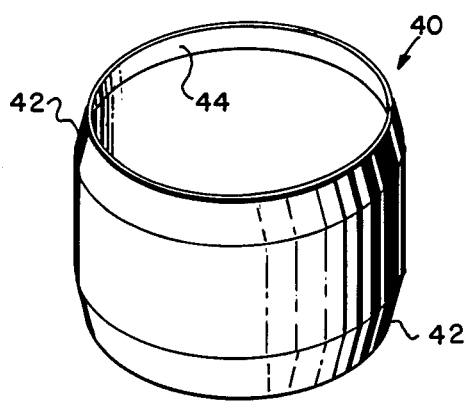
FIG. 3 is a perspective view of a nipple according to this invention.

Analysis will show that although the nipple is usually loose in the cuff during assemble, if excessive internal pressures within the tubing string were to cause the nipple to swell, that its swelling would be limited by the inside diameter of the cuff. If the outside diameter of the nipple is less than the smallest inside diameter of the cuff, the nipple itself will have a wall thickness less than the wall thickness "t" of the ends of either tubing section 24 or 26. The inside diameter of the nipple is slightly greater than the inside diameter of the bore of the tubing sections 24 and 26. Therefore, there will be no restriction in the bore of the string from the surface of the earth to the oil bearing formation. It is also evident from an examination of FIG. 2, that the taper forms a smooth and fair transition from the inside diameter of the tubing section to the inside diameter of the nipple.

Also, it is desirable to have internal taper 44 on each of the ends of the nipple 40. The internal taper angle is not critical and can be about the same as the outside taper.

To use the invention, the regular procedure will be to form joints with the cuff 28 attached to one of the ends of the tubing section with a predetermined torque. The cuff 28 will be attached to the tubing section with torque not greater than the API torque which is finally applied to the two tubing sections in the well. The the joint having the tubing section 26 is lowered into the well with the cuff 28 at the top and extending above the surface of the earth. Nipple 40 is dropped within the cuff. It will be understood that the threads on the cuff and the external threads on the tubing section will be tapered. Therefore, the cuff will have an inside diameter which is larger at the ends and is the smallest at the median point between the ends. The outside diameter of the nipple 40 is equal or smaller (not greater) than the smallest inside diameter of the cuff 28. Therefore, the nipple may be dropped into the cuff. The preferred fit of the nipple in the cuff is that the nipple will drop loosely in the cuff.

As indicated above, the API has tolerance for the cuffs. Considerable tolerance is allowed for the smallest inside diameter of the cuff 28. Therefore, within the range of tolerances, the nipple will normally freely fall within the cuff. However, if the cuff has an inside diameter which is which is as small as the limit of the tolerance provides, it may be necessary to push the nipple 40 within the cuff 28. I.e., if the cuff had such an extremely small inside diameter, there would be a "medium fit" or a hand assembly fit between the nipple and the cuff with the nipple moveable in the cuff. However, normally with run of the mill cuffs, most of the nipples will form a "free fit", meaning that the nipple readily enters the cuff and is moveable in the cuff, or a "loose fit", meaning that the nipple falls freely within the cuff. Inasmuch as for readily assemble, it is preferred that the nipple have a free or loose fit within all cuffs.

However, it is acceptable if the nipple has a medium or hand assemble fit within the cuffs having the minimum inside diameter. With the tolerances allowed by the API standards, if the nipple has a hand assembly fit within a cuff with the minimum inside diameter, it will have a loose fit within many of the cuffs within the tolerances.

After the nipple is in the cuff, the tubing section 24 is placed upon the cuff and threaded to the cuff. It is torqued to the API specifications. The length of the nipple 40 is such that the nipple will form a fluid tight fit to the internal bevel 36 of the ends 30 of the tubing section 24 and 26 when these tubing sections are connected to the cuff 28 with the prescribed torque thereon.

It may be seen that the nipple floats in the joint. I.e., the nipple can move up and down relative to the cuff as the tubing sections 24 and 26 are torqued to their final fit.

It will be understood that as the sections are torqued to the API standards that there will be a certain amount of compression occurring on the nipple. Therefore, the inside bevel is placed upon the nipple so that if the nipple is squeezed inwardly at the end, that it will not form a ledge or abrupt change in the diameter which might cause a tool which is running through the tubing to catch on this abrupt change.

The taper on the outside of the nipple is not critical. It has been found that tapers as small as 10° are undesirable. Although normally the nipple will drop within the cuff and fit within the ends of the tubing satisfactorily, occasionally one of the cuffs will be slightly misaligned to cause problems. Stated otherwise, a 10° taper, although operable, is not commercially acceptable. It is felt to be commercially successful, substantially all of the nipples should connect without any problems. A taper of 15° is shown to be commercially acceptable and also at about 12° is about the limit on the minimum side of the taper angle which is commercially acceptable.

As an upper limit of the taper angle, there must are two considerations. One, that there be sufficient angle so that there is a sufficient surface to form a good seal. The other consideration is that there be correct compressive force on the sealing surfaces. Even with the tolerance in the threads of the tubing and the tolerance in the cuffs, there must be a tight fit so that the nipple is correctly sealed to the tubing when the tubing is correctly torqued to the cuff. In this regard, a 60° taper is the upper extreme within commercial limits.

The preferred angle is about 30°. This is the angle shown in FIG. 5. This angle has certain optimum acceptability for removing the metal from the inside diameter of the bore of the tubing to form the fit and also results in good self aligning and adequate contact surface to form a fluid tight seal. Also, there is sufficient leeway and tolerances. As stated before, although 30° is the preferred angle, certainly good commercial usage could extend from 15° to 45°.

It is desirable that the nipple be accurately centered and coaxial with the threads of the tubing. In some cases, the threads of the tubing may not be concentric with the bore of the tubing. Therefore, when forming the taper within the tubing, it is desirable that the tool which machines the tubing taper 36 be held in alignment by a jig or plug which is threaded onto the threads of the tubing. Therefore, by holding the tapering tool according to the threads of the tubing, it increases the precision of the manufacture so the taper is coaxial with the threads; and therefore, after assembly, the nipple will be coaxial with the threads.

Also, it may be seen that the corrosive fluid will be confined so that it contacts only the bore of the tubing which is coated and the bore of the nipple. The nipple as stated before, is of the corrosion resistant material. Therefore, it is not necessary that the base metal of the tubing or the metal of the cuff be corrosion resistant and no particular additional effort is used to prevent the threads from either tubing or cuff being damaged from corrosion.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. The process of placing a string of tubing in an oil field well;
  a. said string of tubing when placed extending from the surface of the earth to an oil bearing formation far below the surface,
  b. said string made from
     i. a plurality of tubing sections,
     ii. each section having external threads on each end, and
     iii. cuffs with internal threads coupling said tubing sections together,
  c. each of said tubing sections having
     i. an axis,
     ii. a wall thickness, and
     iii. a corrosion resistant coating on its inside bore;

WHEREIN THE
IMPROVED METHOD COMPRISES:

d. placing a section of tubing into the well with a cuff attached to the upper end at the surface of the earth,
  e. dropping a corrosion resistant nipple into the cuff,
  f. said nipple being free and moveable in the cuff,
  g. attaching an additional section of tubing onto the cuff, and
  h. screwing the additional section tightly to the cuff, thereby
  j. forming a fluid tight seal between the corrosion resistant nipple and the section of tubing below the cuff and the section of tubing above the cuff, and
  k. centering the nipple with the two sections of tubing by forming an internal taper of at least 12° to the axis on the bore of the tubings and an external taper of at least 12° to the axis on the exterior ends of the nipple.

2. The invention as defined in claim 1 wherein the internal taper and the external taper are not greater than about 60°.

3. The invention as defined in claim 1 wherein the internal taper and the external taper are at least about 15° and not greater than 45°.

4. In an oil field well having:
 a. a string of tubing extending from the surface of the earth to an oil bearing formation far below the surface,
 b. said string made from
  i. a plurality of tubing sections,
  ii. each section having external threads on each end, and
  iii. cuffs with internal threads coupling said tubing sections together,
 c. each of said a tubing sections having
  i. a tubing bore,
  ii. a tubing axis,
  iii. a wall thickness, and
  iv. a corrosion resistant coating on its bore;

THE IMPROVED STRUCTURE COMPRISING:
 d. the bore of each section of tubing having an internal tapered end,
 e. said tapered end having a corrosion resistant coating,
 f. a corrosion resistant nipple within each cuff,
 g. the nipple having external tapered ends mating with the tapered ends of the tubing bores, thus forming fluid tight seals between the nipple and tubing section, and
 h. the taper on each nipple and tubing bore being at least about 12° to the axis.

5. The invention as defined in claim 4 further comprising:
 j. the taper on each of the nipple and tubing bore being not greater than about 60° to the axis.

6. The invention as defined in claim 4 further comprising:
 j. said cuffs having a large inside diameter at each end and their smallest inside diameter between the ends, and
 k. said nipples having a outside diameter which is not greater than the smallest inside diameter of the cuffs,
 l. so that the nipples have a free and moveable fit in the coupling.

7. The invention as defined in claim 4 further comprising:
 j. the nipple having a nipple bore having a diameter which is greater than the diameter of the tubing bore.

8. The invention as defined in claim 4 further comprising:
 j. the taper on each of the nipple and tubing bore being at least about 15° and not greater than 45°.

9. The process of placing a string of tubing in an oil field well;
 a. said string of tubing when placed extending from the surface of the earth to an oil bearing formation far below the surface,
 b. said string made from
  i. a plurality of tubing sections,
  ii. each section having external threads on each end, and
  iii. cuffs with internal threads coupling said tubing sections together,
 c. each of said tubing sections having
  i. an axis,
  ii. a wall thickness, and
  iii. a corrosion resistant coating on its inside bore;

WHEREIN THE IMPROVED METHOD COMPRISES:
 d. placing a section of tubing into the well with a cuff attached to the upper end at the surface of the earth,
 e. dropping a corrosion resistant nipple into the cuff,
 f. said nipple being free and moveable in the cuff,
 g. attaching an additional section of tubing onto the cuff, and
 h. screwing the additional section tightly to the cuff, thereby
 j. forming a fluid tight seal between the corrosion resistant nipple and the section of tubing below the cuff and the section of tubing above the cuff, and
 k. centering the nipple with the two sections of tubing by forming an internal taper of about 30° to the axis on the bore of the tubings and an external taper of about 30° to the axis on the exterior ends of the nipple.

10. In an oil field well having:
 a. a string of tubing extending from the surface of the earth to an oil bearing formation far below the surface,
 b. said string made from
  i. a plurality of tubing sections,
  ii. each section having external threads on each end, and
  iii. cuffs with internal threads coupling said tubing sections together,
 c. each of said tubing sections having
  i. a tubing bore,
  ii. a tubing axis,
  iii. a wall thickness, and
  iv. a corrosion resistant coating on its bore;

THE IMPROVED STRUCTURE COMPRISING:
 d. the bore of each section of tubing having an internal tapered end,
 e. said tapered end having a corrosion resistant coating,
 f. a corrosion resistant nipple within each cuff,
 g. the nipple having external tapered ends mating with the tapered ends of the tubing bores, thus forming fluid tight seals between the nipple and tubing section, and
 h. the taper on each nipple and tubing bore being about 30° to the axis.

11. In an oil field well having:
 a. a string of tubing extending from the surface of the earth to an oil bearing formation far below the surface,
 b. said string made from
  i. a plurality of tubing sections,
  ii. each section having external threads on each end, and
  iii. cuffs with internal threads coupling said tubing sections together,
 c. each of said tubing sections having
  i. a tubing bore,
  ii. a tubing axis,
  iii. a wall thickness, and
  iv. a corrosion resistant coating on its bore;

THE IMPROVED STRUCTURE COMPRISING:

d. the bore of each section of tubing having an internal tapered end,
e. said tapered end having a corrosion resistant coating,
f. a corrosion resistant nipple within each cuff,
g. the nipple having external tapered ends mating with the tapered ends of the tubing bores, thus forming fluid tight seals between the nipple and tubing section,
h. the nipple having a nipple bore with a taper at the nipple bore on each end thereof, and
j. the taper on each nipple and tubing bore being at least about 12° to the axis.

12. The invention as defined in claim 11 further comprising:
k. said cuffs having a large inside diameter at each end and their smallest inside diameter between the ends, and
l. said nipples having a outside diameter which is not greater than the smallest inside diameter of the cuffs,
m. so that the nipples have a free and moveable fit in the coupling.

* * * * *